US012684085B2

(12) United States Patent
Wu et al.

(10) Patent No.: US 12,684,085 B2
(45) Date of Patent: Jul. 14, 2026

(54) VIDEO FUSION METHOD, APPARATUS, ELECTRONIC DEVICE AND STORAGE MEDIUM

(71) Applicant: BEIJING BYTEDANCE NETWORK TECHNOLOGY CO., LTD., Beijing (CN)

(72) Inventors: Zehuan Wu, Beijing (CN); Jing Cheng, Beijing (CN); Zaiqing Su, Beijing (CN); Xuhan Du, Beijing (CN); Shaohui Jiao, Beijing (CN)

(73) Assignee: BEIJING BYTEDANCE NETWORK TECHNOLGY CO., LTD., Beijing (CN)

( * ) Notice: Subject to any disclaimer, the term of this patent is extended or adjusted under 35 U.S.C. 154(b) by 71 days.

(21) Appl. No.: 18/572,746

(22) PCT Filed: Sep. 19, 2022

(86) PCT No.: PCT/CN2022/119508
§ 371 (c)(1),
(2) Date: Dec. 20, 2023

(87) PCT Pub. No.: WO2023/071603
PCT Pub. Date: May 4, 2023

(65) Prior Publication Data
US 2024/0291938 A1     Aug. 29, 2024

(30) Foreign Application Priority Data

Oct. 25, 2021     (CN) .......................... 202111243155.4

(51) Int. Cl.
*G06T 7/55* (2017.01)
*G06T 7/90* (2017.01)
(Continued)

(52) U.S. Cl.
CPC .............. *H04N 5/272* (2013.01); *G06T 7/55* (2017.01); *G06T 7/90* (2017.01); *G06T 19/00* (2013.01);
(Continued)

(58) Field of Classification Search
None
See application file for complete search history.

(56) References Cited

U.S. PATENT DOCUMENTS

2023/0066958 A1*     3/2023     Condorovici ........... G06T 7/194

FOREIGN PATENT DOCUMENTS

| CN | 101859433 A | 10/2010 |
| CN | 101945223 A | 1/2011 |

(Continued)

OTHER PUBLICATIONS

Chinese Patent Application No. 202111243155.; Office Action, dated Mar. 13, 2025, 12 pages with machine translation.
(Continued)

*Primary Examiner* — Tapas Mazumder
(74) *Attorney, Agent, or Firm* — BakerHostetler

(57) ABSTRACT

Disclosed herein are a video fusion method, apparatus, electronic device and storage medium. The video fusion method comprises: receiving a foreground video frame to be fused in a foreground video stream to be fused and a background video frame to be fused in a background video stream to be fused; determining a fusion parameter corresponding to the background video frame to be fused; according to a target foreground processing method corresponding to the foreground video frame to be fused and the fusion
(Continued)

RECEIVE A FOREGROUND VIDEO FRAME TO BE FUSED IN A FOREGROUND VIDEO STREAM TO BE FUSED AND A BACKGROUND VIDEO FRAME TO BE FUSED IN A BACKGROUND VIDEO STREAM TO BE FUSED — S110

DETERMINE A FUSION PARAMETER CORRESPONDING TO THE BACKGROUND VIDEO FRAME TO BE FUSED — S120

ACCORDING TO A TARGET FOREGROUND PROCESSING METHOD CORRESPONDING TO THE FOREGROUND VIDEO FRAME TO BE FUSED AND THE FUSION PARAMETER, DETERMINE A TARGET OBJECT TO BE FUSED CORRESPONDING TO THE FOREGROUND VIDEO FRAME TO BE FUSED — S130

ACCORDING TO THE TARGET OBJECT TO BE FUSED AND THE BACKGROUND VIDEO FRAME TO BE FUSED, DETERMINE THE TARGET FUSED VIDEO FRAME TO BE DISPLAYED AT A TARGET TERMINAL — S140 parameter, determining a target object to be fused corresponding to the foreground video frame to be fused; according to the target object to be fused and the background video frame to be fused, determining the target fused video frame to be displayed at a target terminal.

20 Claims, 2 Drawing Sheets

(51) Int. Cl.
    *G06T 19/00*        (2011.01)
    *H04N 5/272*      (2006.01)

(52) U.S. Cl.
    CPC .............. *G06T 2207/10016* (2013.01); *G06T 2207/10024* (2013.01); *G06T 2207/20221* (2013.01)

(56) References Cited

FOREIGN PATENT DOCUMENTS

| | | | |
|---|---|---|---|
| CN | 107527335 A | 12/2017 |
| CN | 109859100 A | 6/2019 |
| CN | 111260601 A | 6/2020 |
| CN | 112312195 A | 2/2021 |
| CN | 113160358 A | 7/2021 |
| CN | 113240700 A | 8/2021 |
| CN | 113436343 A | 9/2021 |
| CN | 113989173 A | 1/2022 |
| JP | 2013-149219 A | 8/2013 |

OTHER PUBLICATIONS

International Patent Application No. PCT/CN2022/119508; Int'l Search Report; dated Oct. 28, 2022; 2 pages.
China Patent Application No. 202111243155.4; Second Office Action; dated Sep. 30, 2025; 12 pages.

* cited by examiner

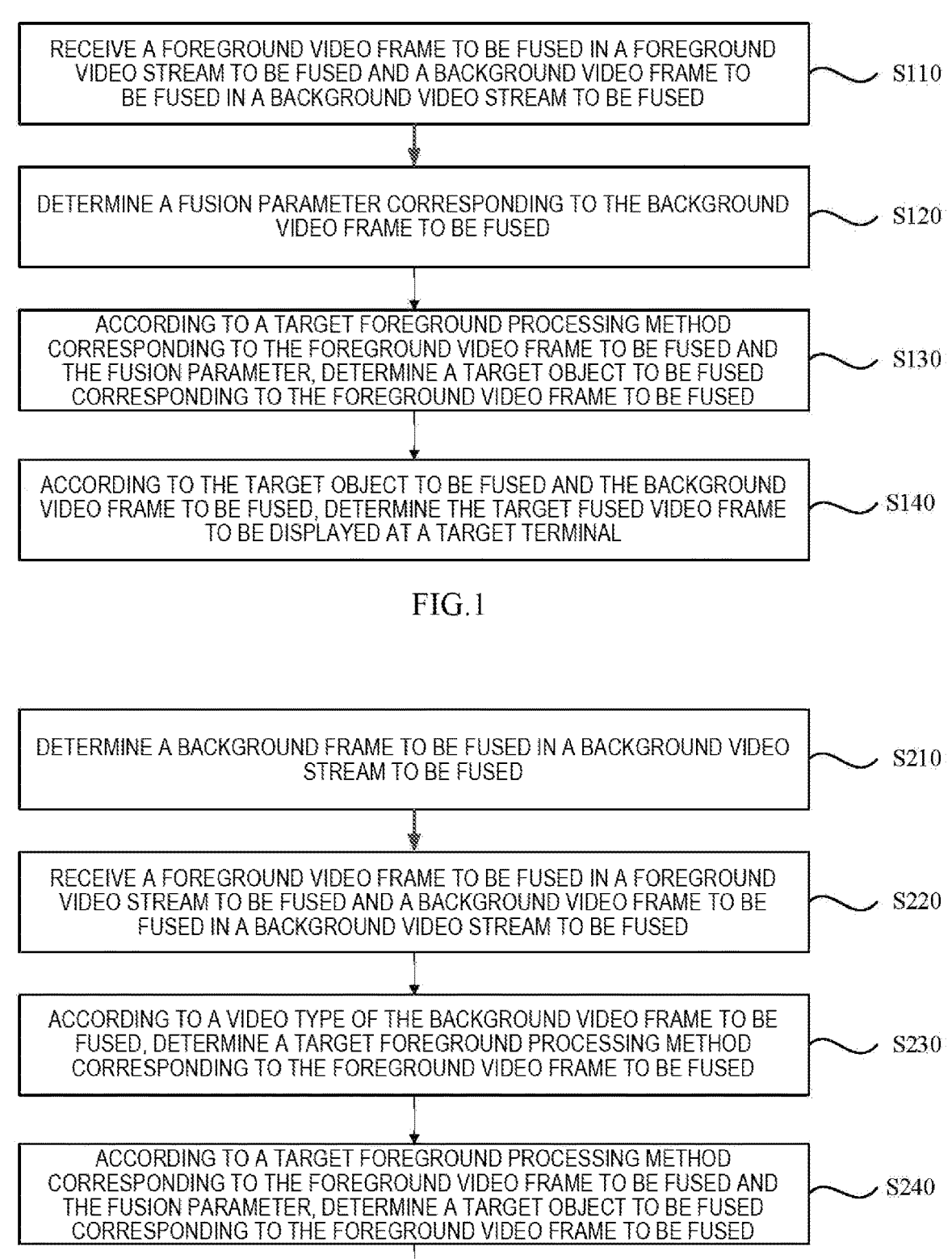

RECEIVE A FOREGROUND VIDEO FRAME TO BE FUSED IN A FOREGROUND VIDEO STREAM TO BE FUSED AND A BACKGROUND VIDEO FRAME TO BE FUSED IN A BACKGROUND VIDEO STREAM TO BE FUSED — S110

DETERMINE A FUSION PARAMETER CORRESPONDING TO THE BACKGROUND VIDEO FRAME TO BE FUSED — S120

ACCORDING TO A TARGET FOREGROUND PROCESSING METHOD CORRESPONDING TO THE FOREGROUND VIDEO FRAME TO BE FUSED AND THE FUSION PARAMETER, DETERMINE A TARGET OBJECT TO BE FUSED CORRESPONDING TO THE FOREGROUND VIDEO FRAME TO BE FUSED — S130

ACCORDING TO THE TARGET OBJECT TO BE FUSED AND THE BACKGROUND VIDEO FRAME TO BE FUSED, DETERMINE THE TARGET FUSED VIDEO FRAME TO BE DISPLAYED AT A TARGET TERMINAL — S140

FIG.1

DETERMINE A BACKGROUND FRAME TO BE FUSED IN A BACKGROUND VIDEO STREAM TO BE FUSED — S210

RECEIVE A FOREGROUND VIDEO FRAME TO BE FUSED IN A FOREGROUND VIDEO STREAM TO BE FUSED AND A BACKGROUND VIDEO FRAME TO BE FUSED IN A BACKGROUND VIDEO STREAM TO BE FUSED — S220

ACCORDING TO A VIDEO TYPE OF THE BACKGROUND VIDEO FRAME TO BE FUSED, DETERMINE A TARGET FOREGROUND PROCESSING METHOD CORRESPONDING TO THE FOREGROUND VIDEO FRAME TO BE FUSED — S230

ACCORDING TO A TARGET FOREGROUND PROCESSING METHOD CORRESPONDING TO THE FOREGROUND VIDEO FRAME TO BE FUSED AND THE FUSION PARAMETER, DETERMINE A TARGET OBJECT TO BE FUSED CORRESPONDING TO THE FOREGROUND VIDEO FRAME TO BE FUSED — S240

ACCORDING TO THE TARGET OBJECT TO BE FUSED AND THE BACKGROUND VIDEO FRAME TO BE FUSED, DETERMINE THE TARGET FUSED VIDEO FRAME TO BE DISPLAYED AT A TARGET TERMINAL — S250

FIG.2

| 310 | 320 | 330 | 340 |
|---|---|---|---|
| VIDEO FRAME RECEIVING MODULE | FUSION PARAMETER DETERMINATION MODULE | FUSION OBJECT DETERMINATION MODULE | VIDEO FUSION MODULE |

400

401        402        403
PROCESSING DEVICE    ROM    RAM

404

405

I/O INTERFACE 406        407        408        409
INPUT DEVICE    OUTPUT DEVICE    STORAGE DEVICE    COMMUNICATION DEVICE

VIDEO FUSION METHOD, APPARATUS, ELECTRONIC DEVICE AND STORAGE MEDIUM

This application is the U.S. National Stage Application of International Patent Application No. PCT/CN2022/119508, filed on Sep. 19, 2022, which claims priority to Chinese Patent Application No. 202111243155.4 filed on Oct. 25, 2021, which are incorporated herein by reference in their entireties.

TECHNICAL FIELD

The present disclosure relates to the field of computer technology, such as a video fusion method, device, electronic device, and storage medium.

BACKGROUND

With the development of multimedia technology, in order to meet the diverse needs of users for videos, multiple video lives can be integrated together, for example, by combining live video with live virtual reality (VR) to output a digitally created stage live effect.

However, video live fusion often requires the introduction of green screen cutout technology, which requires large-scale construction of green screen scenes, resulting in a high threshold for video live fusion. At the same time, due to the implementation of video fusion based on green screen cutout, the resulting images are mostly green, resulting in unrealistic fusion effects and poor user experience.

SUMMARY

The present disclosure provides a video fusion method, apparatus, electronic device, and storage medium to achieve universality of video fusion and improve the technical effect of user experience.

The present disclosure provides a video fusion method, comprising:

Receiving a foreground video frame to be fused in a foreground video stream to be fused and a background video frame to be fused in a background video stream to be fused;

Determining a fusion parameter corresponding to the background video frame to be fused;

According to a target foreground processing method corresponding to the foreground video frame to be fused and the fusion parameter, determining a target object to be fused corresponding to the foreground video frame to be fused;

According to the target object to be fused and the background video frame to be fused, determining the target fused video frame to be displayed at a target terminal.

The present disclosure also provides a video fusion device, which comprises:

A video frame receiving module configured to receive a foreground video frame to be fused in a foreground video stream to be fused and a background video frame to be fused in a background video stream to be fused;

A fusion parameter determination module configured to determine a fusion parameter corresponding to the background video frame to be fused;

A fusion object determination module configured to according to a target foreground processing method corresponding to the foreground video frame to be fused and the fusion parameter, determine a target object to be fused corresponding to the foreground video frame to be fused;

A video fusion module configured to according to the target object to be fused and the background video frame to be fused, determine the target fused video frame to be displayed at a target terminal.

The present disclosure also provides an electronic device comprising:

One or more processors;

A storage device configured to store one or more programs;

When the one or more programs are executed by the one or more processors, the one or more processors implement the above video fusion method.

The present disclosure also provides a storage medium containing computer-executable instructions for performing the video fusion method described above when executed by a computer processor.

BRIEF DESCRIPTION OF THE DRAWINGS

FIG. 1 is a schematic diagram of a video fusion method provided in the first embodiment of the present disclosure.

FIG. 2 is a schematic diagram of a video fusion method provided in the second embodiment of the present disclosure.

DETAILED DESCRIPTION

Figures 3, 4:
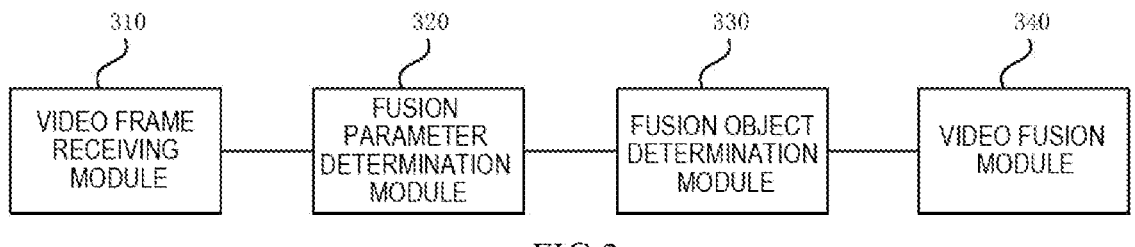
FIG. 3 is a schematic diagram of the structure of a video fusion apparatus provided in the third embodiment of the present disclosure.
FIG. 4 is a schematic diagram of the structure of an electronic device provided in the fourth embodiment of the present disclosure.

The following will describe the embodiments of the present disclosure with reference to the accompanying drawings. Although some embodiments of the present disclosure are shown in the drawings, the present disclosure can be implemented in various forms, and these embodiments are provided to understand the present disclosure. The drawings and embodiments of the present disclosure are for illustrative purposes only.

The multiple steps described in the method implementation method of this disclosure can be executed in different orders and/or in parallel. In addition, the method implementation method can include additional steps and/or omit the steps shown. The scope of this disclosure is not limited in this regard.

The term "comprising" and its variations as used herein are open to include, i.e. "comprising but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

The concepts of "first" and "second" mentioned in this disclosure are only used to distinguish different devices, modules, or units, and are not intended to limit the order or interdependence of the functions performed by these devices, modules, or units. It should be noted that the modifications of "one" and "multiple" mentioned in this disclosure are illustrative and not restrictive. Those skilled in the art should understand that unless otherwise indicated in the context, they should be understood as "one or more".

The names of the messages or information exchanged between multiple devices in this public implementation are for illustrative purposes only and are not intended to limit the scope of these messages or information.

Before introducing this technical solution, an exemplary description of the application scenario can be given. This technical solution can be applied to scenarios such as fusion live scenes and fusion short video capturing, such as scenes where two video streams are fused, such as scenes where the video stream of scene 1 and scene 2 are fused.

First Embodiment

FIG. 1 is a schematic flow diagram of a video fusion method according to an embodiment of the present disclosure, the present embodiment is applicable to the case of at least two video streams are fused, the method may be performed by a video fusion device, the device may be implemented in the form of software and/or hardware, the hardware may be an electronic device, such as a mobile terminal, a personal computer (Personal Computer, PC) or server side.

As shown in FIG. 1, the method of this embodiment comprises:

S110, receive a foreground video frame to be fused in a foreground video stream to be fused and a background video frame to be fused in a background video stream to be fused.

In streaming media-based communication or interaction schemes, audio & video transmission between multiple ports is usually carried out in a streaming manner, for example, multiple video frames are transmitted in the form of video streams.

The video frame to which the object to be fused belongs can be used as the foreground video frame to be fused. For example, if user A in a video frame is to be fused into another video frame, the video frame to which user A belongs can be used as the foreground video frame to be fused. Correspondingly, the video stream to which user A belongs is used as the foreground video stream to be fused. The video frame to which the object to be fused is used as the background video frame to be fused. Correspondingly, the video to which each background video frame to be fused belongs is used as the background video stream to be fused.

For example, if it is necessary to integrate an indoor user A into a street scene, the video stream including user A in the room can be captured based on the image capture device as a foreground video stream to be fused; at the same time, the video stream of the street scene can be captured based on the image capture device as a background video stream to be fused. The background video frames of the foreground video stream to be fused and the background video stream to be fused at the same time can be processed to achieve the fusion of user A into multiple street scenes.

If only image fusion is required, a video frame selected from the background video stream to be fused and a video frame selected from the foreground video stream to be fused can be fused according to the user's preference. If video fusion is required, the video frames of the foreground video stream to be fused and the background video stream to be fused can be sequentially fused at the same time; or, the video frames of the same frame number in the foreground video stream to be fused and the background video stream to be fused can be processed to obtain the final required target video frame, and then the target video can be obtained based on multiple target video frames.

S120, determine a fusion parameter corresponding to the background video frame to be fused.

In practical applications, there are certain differences in the capturing parameter and environmental parameter of the foreground video frame to be fused and the background video frame to be fused. Therefore, when the obtained foreground video frame to be fused and the background video frame to be fused are directly fused, there is a problem of low realism. For example, the background video frame to be fused is a street scene at night, and the foreground video frame to be fused is shot under the condition that all indoor lights are turned on, that is, there is a large difference in the environmental parameter of the street scene at night and the indoor scene. If the target object of the indoor scene is fused into the street scene at night, there is a problem of strong brightness of the target object, resulting in low fusion realism.

In order to solve the above problems, when determining the background video frames to be fused in the background video stream to be fused, a fusion parameter of the background video frames to be fused can be determined first, which can be a color temperature parameter or a saturation parameter. The advantage of determining the above parameter is that the parameter of the fusion object to be processed in the foreground video frame to be fused can be adjusted based on the fusion parameter, thereby obtaining the fused video frames with higher realism.

After receiving the background video frame to be fused, the fusion parameter in the background video frame to be fused can be determined based on a pre-set algorithm, such as a color temperature parameter.

In this embodiment, determining the fusion parameter corresponding to the background video frame to be fused comprises: determining the color temperature parameter of the background video frame to be fused.

S130, according to a target foreground processing method corresponding to the foreground video frame to be fused and the fusion parameter, determine a target object to be fused corresponding to the foreground video frame to be fused.

The processing method for processing the foreground video frames to be fused can be used as the target foreground processing method. The video types of the background video frames to be fused include multiple types, and the processing method corresponding to the video type is used as the target foreground processing method for the foreground video frames to be fused. The target object to be fused can be the main object in the foreground video frame to be fused. The main object can be pre-set. For example, if the user in the foreground video frame to be fused is to be fused into the background video frame to be fused, the processed user can be used as the target object to be fused; if both the pet and the user in the foreground video frame to be fused are to be fused into the background video frame to be fused, both the processed pet and the user can be used as the target object to be fused.

According to the video type of the background video frame to be fused, the target foreground processing method for processing the fused foreground video frame can be determined. Based on the target foreground processing method, the fused foreground video frame is extracted and processed to obtain the fused object to be processed. According to the fusion parameter of the background video frame to be fused and the fused object to be processed, the target object to be fused corresponding to the fused foreground video frame can be determined.

Based on the color temperature parameter in the fusion parameter, white balance processing can be performed on the fusion object to be processed in the fusion foreground video frame to obtain the target fusion object.

S140, according to the target object to be fused and the background video frame to be fused, determine the target fused video frame to be displayed at a target terminal.

The target fusion video frame is the final video frame obtained by fusing the foreground video frame and the background video frame to be fused.

The above steps can be repeated to obtain multiple target fusion video frames, and the target video can be obtained based on multiple target fusion video frames.

After determining the target object to be fused, the target object to be fused may be added to the background video frame to be fused, to obtain a target fusion video frame to be displayed at the target terminal.

According to the technical solution of the disclosed embodiment, after receiving the foreground video frame to be fused and the background video frame to be fused, the fusion parameter of the background video frame to be fused and the fusion object to be processed for the foreground video frame to be fused can be respectively determined. Based on the fusion parameter, the fusion object to be processed is processed, the target object to be fused is determined, and the target video frame is obtained based on the target object to be fused and the background video frame to be fused. This solves the problem that green screen cutout technology needs to be introduced when video fusion is performed in related technologies, that is, a green screen needs to be built, which leads to a high threshold for live construction and poor universality. At the same time, because it is a green screen built, the fused image is relatively green, which has a large difference from the actual image, resulting in a low degree of authenticity after fusion. It realizes that under the condition of no need to build a green screen, the parameter of the fusion object to be processed in the foreground video frame can be adjusted based on the fusion parameter of the background video stream to be fused.

Second Embodiment

FIG. 2 is a schematic diagram of a video fusion method flow provided in the second embodiment of the present disclosure. Based on the above embodiments, the foreground video frame to be fused can be processed according to the video type of the background video frame to be fused to obtain the target object to be fused. The specific implementation method can be found in the detailed description of this technical solution. The same or corresponding technical terms as the above embodiments will not be repeated here.

As shown in FIG. 2, the method comprises:

S210, determine a background frame to be fused in a background video stream to be fused.

In this embodiment, at least one of the following three methods can be used to determine the background video frames to be fused in the background video stream to be fused.

The first implementation method can be: determining a three-dimensional model corresponding to the target scene based on an obtained depth video stream of a target scene, and determining the background video frame to be fused based on the three-dimensional model.

In order to obtain a depth image that can reflect the geometric depth information of the scene while collecting color images of the scene, at least two cameras need to be deployed for capturing. One camera is set to obtain a color image of the target scene, and the other camera is set to obtain a depth image of the target scene. Finally, based on the images in the data transmission channel corresponding to the two cameras, a depth video stream containing color images and depth images can be obtained by aiming at the target scene from the same perspective. After the computing end receives the depth video stream, these data can be used as the original data source to construct a three-dimensional model. The three-dimensional model is a polygonal representation of the target scene (and objects within the scene), which can reflect the three-dimensional geometric structure of the scene (and objects within the scene). At the same time, based on each frame in the depth video stream, a three-dimensional model can be constructed, and the video stream contains multiple frames of real-time images of the target scene. Therefore, the constructed three-dimensional model is also a dynamic three-dimensional video model. Based on the viewpoint perspective selection, scene of the three-dimensional video model is rendered to obtain a background video frame to be fused.

In the actual application process, in order to improve the efficiency and accuracy of image information collection, more cameras can be deployed from multiple perspectives for the target scene, and the deployment method can be selected according to the task requirements. The disclosed embodiments are not limited here.

When determining the background video frame to be fused based on the deep video stream, the three-dimensional model can be determined first based on the deep video stream, and then the scene can be drawn according to the selected perspective to obtain the background video frame to be fused.

The second implementation method can be: rendering the virtual scene according to a pre-set camera rendering parameter, and using the video frame corresponding to the rendered virtual scene as the background video frame to be fused.

For 3D fusion/spatial fusion, it is necessary to project the real object to be fused into the virtual scene space. The camera parameter and motion information of the camera that captures the real image and the virtual camera in the 3D space are bound to achieve the purpose of fusion. For example, the ground where the Target User is actually standing and the ground in the virtual space are overlapped to avoid the problem of the user leaving the ground when walking in the virtual scene, resulting in poor display.

The camera rendering parameter comprises a parameter for capturing virtual scenes. The background video frame to be fused is the video frame obtained by rendering the virtual scene based on the camera rendering parameter.

The rendering parameter can be pre-set, that is, virtual camera parameter in virtual space. Based on the virtual camera parameter, the virtual scene can be rendered and processed to obtain video frames corresponding to the virtual scene, and the video frames obtained at this time can be used as background video frames to be fused.

The third implementation method can be: based on the two-dimensional video stream of the target area captured by the image capture device, each video frame in the two-dimensional video stream is used as the background video frame to be fused.

The two-dimensional video stream can be a video stream shot based on an ordinary image capture device.

It is possible to determine in advance which scene the object to be fused into, and after determining the scene, the two-dimensional video stream of the target scene can be captured based on the image capture device, and each video frame in the captured two-dimensional video stream can be used as the background video frame to be fused.

S220, receive a foreground video frame to be fused in a foreground video stream to be fused and a background video frame to be fused in a background video stream to be fused.

S230, according to a video type of the background video frame to be fused, determine a target foreground processing method corresponding to the foreground video frame to be fused.

As discussed above, it can be seen that the methods of obtaining background video frames to be fused are different, and correspondingly, the video types of background video frames to be fused are also different. At the same time, the processing methods for treating fused foreground video frames are also different under different video types.

The processing method for treating fused foreground video frames can be determined based on the video type of the background video frame to be fused, and this processing method can be used as the target foreground processing method.

In this embodiment, there are at least three ways to determine the background video frame to be fused, and there are at least three types of video types. The video types include at least three-dimensional video streams, two-dimensional video streams, and virtual video stream types. Correspondingly, the processing methods include depth estimation submethods, image space fusion submethods, and cutout algorithms corresponding to the three-dimensional video stream type; cutout algorithms corresponding to the two-dimensional video stream; and foreground camera variation submethods corresponding to the virtual video stream type.

S240, according to a target foreground processing method corresponding to the foreground video frame to be fused and the fusion parameter, determine a target object to be fused corresponding to the foreground video frame to be fused.

In this embodiment, if the video type is a three-dimensional video stream type, the method of processing the fusion parameter and the foreground video frames to be fused based on the target foreground processing method can be: based on the cutout algorithm, determine the fusion object to be processed in the foreground video frame to be fused; based on the depth estimation sub-method, determine the depth information of the foreground video frame to be fused; based on the image space fusion sub-method, process the depth information to be processed, the fusion object to be processed, and the fusion parameter to determine the target object to be fused.

The image cutout algorithm can use the deep learning algorithm. The input of the deep learning algorithm is the original image of the foreground video frame to be fused, and the refined alpha channel corresponding to the portrait is returned. Based on the pixels in the channel, the fusion object to be processed can be determined. The depth estimation sub-method can determine the depth value corresponding to the fusion object to be processed in the foreground video frame to be fused, so as to avoid the situation where the user floats when fusing it into the background video frame to be fused. Based on the depth estimation sub-method, the depth information of the foreground video frame to be fused can be determined, and this depth information can be used as the depth information to be processed. The image space fusion sub-method can process the depth information to be processed, the fusion object to be processed, and the fusion parameter, for example, according to the fusion parameter, the fusion object to be processed is subjected to Self-Adaptation white balance processing. At the same time, the object processed by Self-Adaptation white balance processing is spatially fused based on the depth information to be processed to obtain the target object to be fused.

In this embodiment, self-adaptation white balance can be corrected for scenes with overexposure or insufficient fill light. Here, automatic gamma correction white balance is used to calculate the mean value of the image through the canary release chart, and then the gamma parameter are calculated based on the mean value (gamma=math.log 10 (0.5)/math.log 10 (mean/255)), and then the color balance of the gamma-corrected image is adjusted (by removing a certain proportion of extreme colors and redistributing the colors in the remaining interval) to solve the deviation of image colors that may be introduced by white balance (such as whitening).

In this embodiment, if the video type comprises a two-dimensional video stream, the target foreground processing method is a cutout algorithm. Correspondingly, based on the target foreground processing method, the fused foreground video frame is processed to obtain the target object to be fused, including: determining the fused object to be processed in the fused foreground video frame based on the cutout algorithm; adjusting the white balance of the fused object to be processed based on the fused parameter to determine the target object to be fused.

Based on the cutout algorithm, the fusion object to be processed in the foreground video frame to be fused can be determined. At the same time, based on the color temperature parameter in the fusion parameter, the white balance adjustment of the fusion object to be processed is performed to obtain the target fusion object that matches the fusion object to be processed with the background video frame to be fused.

In this embodiment, if the video type comprises a virtual video type generated based on a virtual scene, the target foreground processing method comprises a foreground camera parameter change sub-mode. Determining the target object to be fused can be: obtaining virtual camera parameter of the background video frame to be fused corresponding to the virtual video stream type; determining the foreground camera parameter corresponding to the foreground video frame to be fused; processing the foreground camera parameter and virtual camera parameter based on the foreground camera change sub-mode to obtain target transformation parameter, and adjusting the to-be-processed fusion object in the foreground video frame to be fused based on the target transformation parameter and fusion parameter to obtain the target object to be fused.

The foreground camera parameter can be the camera parameter when capturing the foreground video frame to be fused. The target transformation parameter are obtained by processing the foreground camera parameter based on the virtual camera parameter corresponding to the background video frame to be fused. Based on the target transformation parameter and fusion parameter, the fusion object to be processed can be processed to obtain the target object to be fused.

In this embodiment, the benefits and purposes of determining the color temperature parameter in the fusion parameter are: considering that the color temperature of the collected foreground video frame and the background video frame to be fused are different, and the main factor affecting the color temperature is the distribution of red and blue, the color temperature of the foreground video frame and the background video frame to be fused is migrated. Only using the RGB channel in the red-green-blue (RGB) color space for processing will result in color imbalance, so the foreground video frame and the background video frame to be fused can be converted to the color model (LAB) color space (−a * represents the component from green to red, and −b * represents the component from blue to yellow), and the corresponding a and b channels are matched (that is, the corresponding channel of the foreground video frame to be fused is redistributed according to the mean and variance of the corresponding channel of the background video frame to be fused).

S250, according to the target object to be fused and the background video frame to be fused, determine the target fused video frame to be displayed at a target termina.

Target terminal may be an terminal device to watch live.

After obtaining the foreground video frame to be fused corresponding to the target object to be fused, the target object to be fused may be fused into the background video frame to be fused, to obtain a target video frame displayed in the target fusion terminal.

According to the technical solution of the disclosed embodiment, after receiving the foreground video frame to be fused and the background video frame to be fused, the fusion parameter of the background video frame to be fused and the fusion object to be processed for the foreground video frame to be fused can be respectively determined. Based on the fusion parameter, the fusion object to be processed is processed, the target object to be fused is determined, and the target video frame is obtained based on the target object to be fused and the background video frame to be fused. This solves the problem that green screen cutout technology needs to be introduced when video fusion is performed in related technologies, that is, a green screen needs to be built, which leads to a high threshold for live construction and poor universality. At the same time, because it is a green screen built, the fused image is relatively green, which has a large difference from the actual image, resulting in a low degree of authenticity after fusion. It realizes that under the condition of no need to build a green screen, the parameter of the fusion object to be processed in the foreground video frame can be adjusted based on the fusion parameter of the background video stream to be fused.

Third Embodiment

FIG. 3 is a schematic diagram of the structure of a video fusion apparatus provided in the third embodiment of the present disclosure, which can execute any video fusion method provided in any embodiment of the present disclosure, and has corresponding functional modules and effects for executing the method. As shown in FIG. 3, the device comprises: a video frame receiving module 310, a fusion parameter determining module 320, a fusion object determining module 330, and a video fusion module 340.

A video frame receiving module 310 configured to receive a foreground video frame to be fused in a foreground video stream to be fused and a background video frame to be fused in a background video stream to be fused; a fusion parameter determining module 320 configured to determine a fusion parameter corresponding to the background video frame to be fused; a fusion object determining module 330 configured to determine a target object to be fused corresponding to the foreground video frame to be fused according to a target foreground processing method corresponding to the foreground video frame to be fused and the fusion parameter; and a video fusion module 340 configured to determine a target fused video frame to be displayed at a target terminal based on the target object to be fused and the background video frame to be fused.

Based on the above technical solution, the fusion parameter determination module 320 is configured to: determine the color temperature parameter of the background video frame to be fused.

Based on the above technical solution, the device further comprises a background video frame determination module to be fused, which is configured to:

Determine three-dimensional model corresponding to a target scene according to an obtained depth video stream of the target scene, and determining the background video frame to be fused according to the three-dimensional model; or, render a virtual scene according to the pre-set camera rendering parameter, and use a video frame corresponding to the rendered virtual scene as the background video frame to be fused; or, based on a two-dimensional video stream of a target area captured by an image capture device, use each video frame in the two-dimensional video stream as the background video frame to be fused.

Based on the above technical solution, the fusion object determination module 330 is configured to: determine the target foreground processing method corresponding to the background video frame to be fused according to a video type of the background video frame to be fused; process the target foreground video frame to be fused according to the target foreground processing method and the fusion parameter to obtain the target object to be fused.

On the basis of the above technical solution, the video type comprises a three-dimensional video stream type, and the target foreground processing method comprises a depth estimation sub-method, an image space fusion sub-method, and a cutout algorithm. The fusion object determination module 330 comprises: a fusion object determination unit set to determine the fusion object to be processed in the foreground video frame based on the cutout algorithm; a depth information determination unit set to determine the depth information to be processed for the fusion foreground video frame based on the depth estimation sub-method; and a fusion object determination unit set to process the depth information to be processed, the fusion object to be processed, and the fusion parameter based on the image space fusion sub-method to determine the target fusion object.

Based on the above technical solution, the video type comprises a two-dimensional video stream, and the fusion object determination module 330 comprises: a fusion object determination unit to be processed, which is configured to determine the fusion object to be processed in the foreground video frame based on the image cutout algorithm; and a fusion object determination unit to adjust a white balance of the fusion object to be processed based on the fusion parameter to determine the target fusion object to be processed.

Based on the above technical solution, the video type comprises a virtual video stream type generated based on a virtual scene, and the fusion object determination module 330 comprises: a virtual camera parameter determination unit set to obtain a virtual camera parameter corresponding to the background video frame to be fused; a foreground camera parameter determination unit set to determine the foreground camera parameter corresponding to the foreground video frame to be fused; and a fusion object determination unit set to process the foreground camera parameter and the virtual camera parameter based on the foreground camera change submode to obtain target transformation parameter, and adjust the fusion object to be processed in the foreground video frame to be fused based on the target transformation parameter and the fusion parameter to obtain the target object to be fused.

Based on the above technical solution, the video fusion module 340 is configured to: add the target object to be fused to the background video frame to be fused, and obtain the target fused video frame to be displayed at the target terminal.

According to the technical solution of the disclosed embodiment, after receiving the foreground video frame to be fused and the background video frame to be fused, the fusion parameter of the background video frame to be fused and the fusion object to be processed for the foreground video frame to be fused can be respectively determined. Based on the fusion parameter, the fusion object to be processed is processed, the target object to be fused is determined, and the target video frame is obtained based on the target object to be fused and the background video frame to be fused. This solves the problem that green screen cutout technology needs to be introduced when video fusion is carried out in related technologies, that is, green screen needs to be built, which leads to a high threshold for live construction and poor universality. At the same time, because it is a green screen built, the fused image is relatively green, which has a large difference from the actual image, resulting in a low degree of authenticity after fusion. It realizes that under the condition of no need to build a green screen, the parameter of the fusion object to be processed in the foreground video frame can be adjusted based on the fusion parameter of the background video stream to be fused.

The video fusion device provided in the present disclosure can execute any video fusion method provided in any embodiment of the present disclosure, and has corresponding functional modules and effects for executing the method.

The multiple units and modules included in the above device are only divided according to functional logic, but are not limited to the above division, as long as the corresponding functions can be realized; in addition, the names of multiple functional units are only for the convenience of distinguishing each other and are not used to limit the protection scope of the disclosed embodiments.

Fourth Embodiment

FIG. 4 is a schematic diagram of the structure of an electronic device provided in the fourth embodiment of the present disclosure. Referring to FIG. 4 below, it shows a schematic diagram of the structure of an electronic device (such as an terminal device or server in FIG. 4) 400 suitable for implementing the present disclosure. The terminal device 400 in the present disclosure can include but is not limited to mobile terminals such as mobile phones, laptops, digital broadcast receivers, personal digital assistants (PDAs), tablet computers (Portable Android Device, PAD), portable multimedia players (Portable Media Player, PMP), car-mounted terminals (such as car navigation terminals), and fixed terminals such as digital televisions (TV), desktop computers, etc. The electronic device 400 shown in FIG. 4 is only an example and should not bring any restrictions on the functionality and scope of use of the present disclosure.

As shown in FIG. 4, the electronic device 400 may include a processing device (such as a Central Processor, graphics processing unit, etc.) 401, which can perform various appropriate actions and processes based on programs stored in Read-Only Memory (ROM) 402 or loaded from storage device 408 into Random Access Memory (RAM) 403. In RAM 403, various programs and data required for the operation of the electronic device 400 are also stored. The processing devices ROM 401, 402, and RAM 403 are connected to each other via bus 404. The edit/output (I/O) interface 405 is also connected to bus 404.

Typically, the following devices can be connected to the I/O interface 405: input devices 406 including touch screens, touchpads, keyboards, mice, cameras, microphones, accelerometers, gyroscopes, etc.; output devices 407 including liquid crystal displays (LCDs), speakers, vibrators, etc.; storage devices 408 including magnetic tapes, hard disks, etc.; and communication devices 409. Communication devices 409 can allow electronic devices 400 to communicate wirelessly or wirelessly with other devices to exchange data. Although FIG. 4 shows an electronic device 400 with multiple devices, it is not required to implement or have all of the devices shown. More or fewer devices can be implemented or provided instead.

According to embodiments of the present disclosure, the process described above with reference to the flowchart can be implemented as a computer software program. For example, embodiments of the present disclosure include a computer program product that comprises a computer program carried on a non-transitory computer-readable medium, the computer program containing program code for performing the method shown in the flowchart. In such embodiments, the computer program can be downloaded and installed from the network through the communication device 409, or installed from the storage device 408, or installed from the ROM 402. When the computer program is executed by the processing device 401, the above functions defined in the method of the present disclosure embodiment are performed.

The names of the messages or information exchanged between multiple devices in this public implementation are for illustrative purposes only and are not intended to limit the scope of these messages or information.

The electronic device provided in this public embodiment belongs to the same concept as the video fusion method provided in the above embodiments. Technical details that are not described in detail in this embodiment can be found in the above embodiments, and this embodiment has the same effect as the above embodiments.

Fifth Embodiment

The present disclosure provides a computer storage medium having a computer program stored thereon, which implements the video fusion method provided in the above embodiments when executed by a processor.

The computer-readable storage medium described above can be a computer-readable signal medium or a computer-readable storage medium, or any combination thereof. The computer-readable storage medium can be, for example, but not limited to, an electrical, magnetic, optical, electromagnetic, infrared, or semiconductor system, device, or device, or any combination thereof. Examples of computer-readable storage media can include but are not limited to: an electrical connection with one or more wires, a portable computer disk, a hard disk, RAM, ROM, an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium can be any tangible medium containing or storing a program that can be used by an instruction execution system, device, or device, or in combination therewith. In the present disclosure, a computer-readable signal medium can include a data signal propagated in baseband or as part of a carrier wave, which carries computer-readable program code. Such propagated data signals can take many forms, including but not limited to electromagnetic signals, optical signals, or any suitable combination thereof. Computer-readable signal media can also be any computer-readable medium other than computer-readable storage media, which can send, propagate, or transmit programs for use by or in conjunction with instruction execution systems, devices, or devices. The program code contained on the computer-readable medium can be transmitted using any suitable medium, including but not limited to: wires, optical cables, radio frequency (RF), etc., or any suitable combination thereof.

In some implementation methods, clients and servers can communicate using any currently known or future developed network protocol such as HyperText Transfer Protocol (HTTP), and can interconnect with any form or medium of digital data communication (such as communication networks). Examples of communication networks include local area networks (LANs), wide area networks (WANs), the Internet (such as the Internet), and end-to-end networks (such as ad hoc end-to-end networks), as well as any currently known or future developed networks.

The computer-readable medium can be included in the electronic device, or it can exist alone without being assembled into the electronic device.

The computer-readable medium carries one or more programs that, when executed by the electronic device, cause the electronic device to: receive a foreground video frame to be fused in a foreground video stream to be fused and a background video frame to be fused in a background video stream to be fused; determine a fusion parameter corresponding to the background video frame to be fused; according to a target foreground processing method corresponding to the foreground video frame to be fused and the fusion parameter, determine a target object to be fused corresponding to the foreground video frame to be fused; according to the target object to be fused and the background video frame to be fused, determine the target fused video frame to be displayed at a target terminal.

It may be one or more programming languages or combinations thereof to write computer program code for performing the operations of the present disclosure, the above-described programming languages include but are not limited to Object Oriented programming languages—such as Java, Smalltalk, C++, further including conventional procedural programming languages—such as "C" language or similar programming languages. The program code may be executed entirely on the user's computer, partially executed on the user's computer, executed as a standalone software package, partially executed on the user's computer on a remote computer, or entirely on a remote computer or server. In the case of a remote computer, the remote computer may be any kind of network-including LAN or WAN-connected to the user's computer, or may be connected to an external computer (e.g., using an Internet service provider to connect via the Internet).

The flowcharts and block diagrams in the accompanying drawings illustrate the architecture, functions, and operations of the system, method, and computer program product that may be implemented in accordance with various embodiments of the present disclosure. In this regard, each block in the flowcharts or block diagrams may represent a module, program segment, or portion of code that contains one or more executable instructions for implementing a specified logical function. It should also be noted that in some alternative implementations, the functions marked in the blocks may also occur in a different order than those marked in the drawings. For example, two consecutive blocks may actually be executed substantially in parallel, and they may sometimes be executed in the opposite order, depending on the function involved. It should also be noted that each block in the block diagrams and/or flowcharts, as well as combinations of blocks in the block diagrams and/or flowcharts, may be implemented using a dedicated hardware-based system that performs the specified function or operation, or may be implemented using a combination of dedicated hardware and computer instructions.

The units described in the disclosed embodiments may be implemented by means of software or hardware, wherein the name of the unit does not constitute a limitation on the unit itself in one case, for example, the fusion parameter determination module may also be described as "a module for determining fusion parameter corresponding to the background video frame to be fused."

The functions described above in this article can be performed at least in part by one or more hardware logic components. For example, without limitation, exemplary types of hardware logic components that can be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, machine-readable media can be tangible media that can contain or store programs for use by or in conjunction with instruction execution systems, devices, or devices. Machine-readable media can be machine-readable signal media or machine-readable storage media. Machine-readable media can include, but are not limited to, electronic, magnetic, optical, electromagnetic, infrared, or semiconductor systems, devices, or devices, or any suitable combination thereof. Examples of machine-readable storage media may include electrical connections based on one or more wires, portable computer disks, hard disks, RAM, ROM, EPROM or flash memory, optical fibers, CD-ROMs, optical storage devices, magnetic storage devices, or any suitable combination thereof.

According to one or more embodiments of the present disclosure, Example 1 provides a video fusion method, which comprises:

receiving a foreground video frame to be fused in a foreground video stream to be fused and a background video frame to be fused in a background video stream to be fused;

determining a fusion parameter corresponding to the background video frame to be fused;

according to a target foreground processing method corresponding to the foreground video frame to be fused and the fusion parameter, determining a target object to be fused corresponding to the foreground video frame to be fused;

according to the target object to be fused and the background video frame to be fused, determining the target fused video frame to be displayed at a target terminal.

According to one or more embodiments of the present disclosure, Example 2 provides a video fusion method, further comprising:

Determining a fusion parameter corresponding to the background video frame to be fused comprises:

Determining a color temperature parameter of the background video frame to be fused.

According to one or more embodiments of the present disclosure, Example 3 provides a video fusion method, further comprising:

Determining a three-dimensional model corresponding to a target scene according to an obtained depth video stream of the target scene, and determining the background video frame to be fused according to the three-dimensional model; or, Rendering a virtual scene according to the pre-set camera rendering parameter, and using a video frame corresponding to the rendered virtual scene as the background video frame to be fused; or, Based on a two-dimensional video stream of a target area captured by an image capture device, using each video frame in the two-dimensional video stream as the background video frame to be fused.

According to one or more embodiments of the present disclosure, Example 4 provides a video fusion method, further comprising:

According to a target foreground processing method corresponding to the foreground video frame to be fused and the fusion parameter, determining a target object to be fused corresponding to the foreground video frame to be fused comprises:

determining the target foreground processing method corresponding to the foreground video frame to be fused according to a video type of the background video frame to be fused;

processing the foreground video frame to be fused according to the target foreground processing method and the fusion parameter to obtain the target object to be fused.

According to one or more embodiments of the present disclosure, Example 5 provides a video fusion method, further comprising:

The video type comprises a three-dimensional video stream type, and the target foreground processing method comprises a depth estimation sub-method, an image space fusion sub-method, and a cutout algorithm, and processing the foreground video frame to be fused according to the target foreground processing method and the fusion parameter to obtain the target object to be fused comprises:

Based on the cutout algorithm, determining a fusion object to be processed in the foreground video frame to be fused;

Determining pending depth information to be processed of the foreground video frame to be fused based on the depth estimation sub-method;

Processing the depth information to be processed, the fusion object to be processed, and the fusion parameter based on the image space fusion sub-method to determine the target fusion object.

According to one or more embodiments of the present disclosure, Example 6 provides a video fusion method, further comprising:

The video type comprises a two-dimensional video stream, the target foreground processing method comprises a cutout algorithm, and processing the foreground video frame to be fused according to the target foreground processing method and the fusion parameter to obtain the target object to be fused comprises:

Based on the cutout algorithm, determining a fusion object to be processed in the foreground video frame to be fused;

Adjusting a white balance of the fusion object to be processed based on the fusion parameter to determine the target fusion object.

According to one or more embodiments of the present disclosure, Example 7 provides a video fusion method, further comprising:

The video type comprises a virtual video stream type generated based on a virtual scene, the target foreground processing method comprises a foreground camera parameter change sub-method, and processing the foreground video frame to be fused according to the target foreground processing method and the fusion parameter to obtain the target object to be fused comprises:

Obtaining a virtual camera parameter of background video frames to be fused corresponding to the virtual video stream type;

Determining a foreground camera parameter corresponding to the foreground video frame to be fused;

Processing the foreground camera parameter and the virtual camera parameter based on the foreground camera change sub-mode to obtain a target transformation parameter, and adjusting the fusion object to be processed in the foreground video frame based on the target transformation parameter and the fusion parameter to obtain the target object to be fused.

According to one or more embodiments of the present disclosure, Example 8 provides a video fusion method, further comprising:

According to the target object to be fused and the background video frame to be fused, determining the target fused video frame to be displayed at a target terminal comprises:

Adding the target object to be fused to the background video frame to be fused to obtain a target fused video frame to be displayed at the target terminal.

According to one or more embodiments of the present disclosure, Example 9 provides a video fusion apparatus comprising:

A video frame receiving module configured to receive a foreground video frame to be fused in a foreground video stream to be fused and a background video frame to be fused in a background video stream to be fused;

A fusion parameter determination module configured to determine a fusion parameter corresponding to the background video frame to be fused;

A fusion object determination module configured to according to a target foreground processing method corresponding to the foreground video frame to be fused and the fusion parameter, determine a target object to be fused corresponding to the foreground video frame to be fused;

A video fusion module configured to according to the target object to be fused and the background video frame to be fused, determine the target fused video frame to be displayed at a target terminal.

In addition, although multiple operations are depicted in a specific order, this should not be understood as requiring these operations to be performed in the specific order shown or in a sequential order. In certain environments, multitasking and parallel processing may be advantageous. Similarly, although multiple implementation details are included in the above discussion, these should not be construed as limiting the scope of the present disclosure. Some features described in the context of individual embodiments can also be implemented in combination in a single embodiment. Conversely, multiple features described in the context of a single embodiment can also be implemented in multiple embodiments separately or in any suitable subcombination.

We claim:

1. A video fusion method, comprising:

receiving a foreground video frame to be fused in a foreground video stream to be fused and a background video frame to be fused in a background video stream to be fused;

determining a fusion parameter corresponding to the background video frame to be fused;

according to a target foreground processing method corresponding to the foreground video frame to be fused and the fusion parameter, determining a target object to be fused corresponding to the foreground video frame to be fused, wherein the determining the target object to be fused corresponding to the foreground video frame to be fused comprises:

determining the target foreground processing method corresponding to the foreground video frame to be fused according to a video type of the background video frame to be fused, and processing the foreground video frame to be fused according to the target foreground processing method and the fusion parameter to obtain the target object to be fused; and according to the target object to be fused and the background video frame to be fused, determining the target fused video frame to be displayed at a target terminal.

2. The method according to claim 1, wherein determining a fusion parameter corresponding to the background video frame to be fused comprises:

determining a color temperature parameter of the background video frame to be fused.

3. The method according to claim 1, wherein a determination method of the background video frame to be fused comprises:

determining a three-dimensional model corresponding to a target scene according to an obtained depth video stream of the target scene, and determining the background video frame to be fused according to the three-dimensional model; or, rendering a virtual scene according to the pre-set camera rendering parameter, and using a video frame corresponding to the rendered virtual scene as the background video frame to be fused; or, based on a two-dimensional video stream of a target area captured by an image capture device, using each video frame in the two-dimensional video stream as the background video frame to be fused.

4. The method according to claim 1, wherein the video type comprises a three-dimensional video stream type, and the target foreground processing method comprises a depth estimation sub-method, an image space fusion sub-method, and a cutout algorithm, and processing the foreground video frame to be fused according to the target foreground processing method and the fusion parameter to obtain the target object to be fused comprises:

based on the cutout algorithm, determining a fusion object to be processed in the foreground video frame to be fused;

determining pending depth information to be processed of the foreground video frame to be fused based on the depth estimation sub-method;

processing the depth information to be processed, the fusion object to be processed, and the fusion parameter based on the image space fusion sub-method to determine the target fusion object.

5. The method according to claim 1, wherein the video type comprises a two-dimensional video stream, the target foreground processing method comprises a cutout algorithm, and processing the foreground video frame to be fused according to the target foreground processing method and the fusion parameter to obtain the target object to be fused comprises:

based on the cutout algorithm, determining a fusion object to be processed in the foreground video frame to be fused;

adjusting a white balance of the fusion object to be processed based on the fusion parameter to determine the target fusion object.

6. The method according to claim 1, wherein the video type comprises a virtual video stream type generated based on a virtual scene, the target foreground processing method comprises a foreground camera parameter change sub-method, and processing the foreground video frame to be fused according to the target foreground processing method and the fusion parameter to obtain the target object to be fused comprises:

obtaining a virtual camera parameter of background video frames to be fused corresponding to the virtual video stream type;

determining a foreground camera parameter corresponding to the foreground video frame to be fused;

processing the foreground camera parameter and the virtual camera parameter based on the foreground camera change sub-mode to obtain a target transformation parameter, and adjusting the fusion object to be processed in the foreground video frame based on the target transformation parameter and the fusion parameter to obtain the target object to be fused.

7. The method according to claim 1, wherein according to the target object to be fused and the background video frame to be fused, determining the target fused video frame to be displayed at a target terminal comprises:

adding the target object to be fused to the background video frame to be fused to obtain a target fused video frame to be displayed at the target terminal.

8. An electronic device comprising:

at least one processor; and a storage device configured to store at least one program;

the at least one program, when executed by at least one processor, causes the at least one processor to implement operations comprising:

receiving a foreground video frame to be fused in a foreground video stream to be fused and a background video frame to be fused in a background video stream to be fused;

determining a fusion parameter corresponding to the background video frame to be fused;

according to a target foreground processing method corresponding to the foreground video frame to be fused and the fusion parameter, determining a target object to be fused corresponding to the foreground video frame to be fused, wherein the determining the target object to be fused corresponding to the foreground video frame to be fused comprises:

determining the target foreground processing method corresponding to the foreground video frame to be fused according to a video type of the background video frame to be fused, and processing the foreground video frame to be fused according to the target foreground processing method and the fusion parameter to obtain the target object to be fused; and according to the target object to be fused and the background video frame to be fused, determining the target fused video frame to be displayed at a target terminal.

9. The electronic device according to claim 8, wherein determining a fusion parameter corresponding to the background video frame to be fused comprises:
    determining a color temperature parameter of the background video frame to be fused.

10. The electronic device according to claim 8, wherein a determination method of the background video frame to be fused comprises:
    determining a three-dimensional model corresponding to a target scene according to an obtained depth video stream of the target scene, and determining the background video frame to be fused according to the three-dimensional model; or,
    rendering a virtual scene according to the pre-set camera rendering parameter, and using a video frame corresponding to the rendered virtual scene as the background video frame to be fused; or,
    based on a two-dimensional video stream of a target area captured by an image capture device, using each video frame in the two-dimensional video stream as the background video frame to be fused.

11. The electronic device according to claim 8, wherein the video type comprises a three-dimensional video stream type, and the target foreground processing method comprises a depth estimation sub-method, an image space fusion sub-method, and a cutout algorithm, and processing the foreground video frame to be fused according to the target foreground processing method and the fusion parameter to obtain the target object to be fused comprises:
    based on the cutout algorithm, determining a fusion object to be processed in the foreground video frame to be fused;
    determining pending depth information to be processed of the foreground video frame to be fused based on the depth estimation sub-method;
    processing the depth information to be processed, the fusion object to be processed, and the fusion parameter based on the image space fusion sub-method to determine the target fusion object.

12. The electronic device according to claim 8, wherein the video type comprises a two-dimensional video stream, the target foreground processing method comprises a cutout algorithm, and processing the foreground video frame to be fused according to the target foreground processing method and the fusion parameter to obtain the target object to be fused comprises:
    based on the cutout algorithm, determining a fusion object to be processed in the foreground video frame to be fused;
    adjusting a white balance of the fusion object to be processed based on the fusion parameter to determine the target fusion object.

13. The electronic device according to claim 8, wherein the video type comprises a virtual video stream type generated based on a virtual scene, the target foreground processing method comprises a foreground camera parameter change sub-method, and processing the foreground video frame to be fused according to the target foreground processing method and the fusion parameter to obtain the target object to be fused comprises:
    obtaining a virtual camera parameter of background video frames to be fused corresponding to the virtual video stream type;

determining a foreground camera parameter corresponding to the foreground video frame to be fused;
    processing the foreground camera parameter and the virtual camera parameter based on the foreground camera change sub-mode to obtain a target transformation parameter, and adjusting the fusion object to be processed in the foreground video frame based on the target transformation parameter and the fusion parameter to obtain the target object to be fused.

14. The electronic device according to claim 8, wherein according to the target object to be fused and the background video frame to be fused, determining the target fused video frame to be displayed at a target terminal comprises:
    adding the target object to be fused to the background video frame to be fused to obtain a target fused video frame to be displayed at the target terminal.

15. A non-transitory storage medium containing computer-executable instructions which, when executed by a computer processor, cause the computer processor to perform operations comprising:
    receiving a foreground video frame to be fused in a foreground video stream to be fused and a background video frame to be fused in a background video stream to be fused;
    determining a fusion parameter corresponding to the background video frame to be fused;
    according to a target foreground processing method corresponding to the foreground video frame to be fused and the fusion parameter, determining a target object to be fused corresponding to the foreground video frame to be fused, wherein the determining the target object to be fused corresponding to the foreground video frame to be fused comprises:
    determining the target foreground processing method corresponding to the foreground video frame to be fused according to a video type of the background video frame to be fused, and
    processing the foreground video frame to be fused according to the target foreground processing method and the fusion parameter to obtain the target object to be fused; and
    according to the target object to be fused and the background video frame to be fused, determining the target fused video frame to be displayed at a target terminal.

16. The non-transitory storage medium according to claim 15, wherein determining a fusion parameter corresponding to the background video frame to be fused comprises:
    determining a color temperature parameter of the background video frame to be fused.

17. The non-transitory storage medium according to claim 15, wherein a determination method of the background video frame to be fused comprises:
    determining a three-dimensional model corresponding to a target scene according to an obtained depth video stream of the target scene, and determining the background video frame to be fused according to the three-dimensional model; or,
    rendering a virtual scene according to the pre-set camera rendering parameter, and using a video frame corresponding to the rendered virtual scene as the background video frame to be fused; or,
    based on a two-dimensional video stream of a target area captured by an image capture device, using each video frame in the two-dimensional video stream as the background video frame to be fused.

18. The non-transitory storage medium according to claim 15, wherein the video type comprises a three-dimensional video stream type, and the target foreground processing method comprises a depth estimation sub-method, an image space fusion sub-method, and a cutout algorithm, and processing the foreground video frame to be fused according to the target foreground processing method and the fusion parameter to obtain the target object to be fused comprises:

based on the cutout algorithm, determining a fusion object to be processed in the foreground video frame to be fused;

determining pending depth information to be processed of the foreground video frame to be fused based on the depth estimation sub-method;

processing the depth information to be processed, the fusion object to be processed, and the fusion parameter based on the image space fusion sub-method to determine the target fusion object.

19. The non-transitory storage medium according to claim 15, wherein the video type comprises a two-dimensional video stream, the target foreground processing method comprises a cutout algorithm, and processing the foreground video frame to be fused according to the target foreground processing method and the fusion parameter to obtain the target object to be fused comprises:

based on the cutout algorithm, determining a fusion object to be processed in the foreground video frame to be fused;

adjusting a white balance of the fusion object to be processed based on the fusion parameter to determine the target fusion object.

20. The non-transitory storage medium according to claim 15, wherein the video type comprises a virtual video stream type generated based on a virtual scene, the target foreground processing method comprises a foreground camera parameter change sub-method, and processing the foreground video frame to be fused according to the target foreground processing method and the fusion parameter to obtain the target object to be fused comprises:

obtaining a virtual camera parameter of background video frames to be fused corresponding to the virtual video stream type;

determining a foreground camera parameter corresponding to the foreground video frame to be fused;

processing the foreground camera parameter and the virtual camera parameter based on the foreground camera change sub-mode to obtain a target transformation parameter, and adjusting the fusion object to be processed in the foreground video frame based on the target transformation parameter and the fusion parameter to obtain the target object to be fused.

* * * * *